Jan. 28, 1969 A. J. LYHUS 3,424,390

CENTER UNWIND WEB SUPPLY

Filed Nov. 29, 1966

INVENTOR.
ARLAN J. LYHUS

United States Patent Office 3,424,390
Patented Jan. 28, 1969

3,424,390

CENTER UNWIND WEB SUPPLY

Arlan J. Lyhus, Seabrook, Md., assignor to Digi-Data Corporation, Bladensburg, Md., a corporation of Maryland Filed Nov. 29, 1966, Ser. No. 597,673
U.S. Cl. 242—55 7 Claims
Int. Cl. B65h *75/02, 17/48;* G11b *23/04*

ABSTRACT OF THE DISCLOSURE

A center unwind web supply is shown having a reel with a central hub pivotally mounted for dispensing the web from the center of its stack. A first and second guide provide web guiding, while the second guide pivots for removing a friction brake from the reel as the tension within the web increases. A bifurcated web arm with fingers extending between the web and central hub prevents the web from tightening about the hub.

The present invention relates to a center unwind web supply and, more particularly, to a device for unwinding a web member from the center of an unpowered supply reel at a substantially high rate of speed without damaging the web.

The use of a web handling device having a web path arrangement wherein the web is removed from the center of a supply reel is well known in the prior art. Such an arrangement is often incorporated by a web handling device wherein the web is removed from the center of an associated supply reel, passed through a web sensing machine, and wound upon a take-up reel. In order to utilize a web member, such as a paper tape, for multiple passes through the web sensing machine, such as a paper tape reader, a reel of tape is often wound upon a take-up reel and removed by hand for placement upon the supply reel. In this configuration the beginning point of the paper tape is found on the inner periphery of the toroidally shaped tape stack. From this point it may again be fed into the tape reader by unwinding it from the center of the supply reel. The alternative to center unwinding is to rewind the tape for placing its beginning point on the outer periphery of the supply reel. The procedure of rewinding a paper tape upon the paper tape machine is to be avoided due to the economy which is characteristic of these machines. That is, a rewind mode is not generally provided within a paper tape machine nor is it desirable, as paper tape does not lend itself to an excess amount of handling. An alternative method of rewinding a paper tape includes the process of manually rewinding the paper tape upon a bench type machine; this occasionally practiced method is obviously undesirable. Therefore, in keeping with the basic advantages of a paper tape system, namely simplicity and economy, the use of a center unwind supply reel is desirable.

In many applications it is advantageous to pass a paper tape through a paper tape reader at a substantially high rate of speed. In prior art devices, high rates of speed can not be obtained from a center unwind supply reel without damaging the paper tape. One application where speed and the absence of a delay would be desirable is the utilization of a paper tape reader as part of a paper tape to magnetic tape converter. That is, where a paper tape is used as an economical means for gathering information prior to transferring the information to a magnetic tape for storage or manipulation. In this application a delay in transferring the information from paper tape to magnetic tape becomes a waste of valuable operating time for both the equipment and the operator. Therefore, it is desirable to increase the speed at which a paper tape reader manipulates the tape and decrease the time during which a paper tape reader is inoperable due to rewinding or loading. One feature which has limited the rate at which a paper tape passes through a paper tape reader has been the inability of such devices to handle and guide the paper tape at an elevated rate of speed without causing damage to the tape. A solution of this problem has been the design of a more complexed machine which is accompanied with an increase in the cost thereof. Such an increase thereby offsetting one of the advantages of a paper tape machine, namely economy.

Accordingly, one object of the present invention is to provide a web supply which will operate at a substantially high rate of speed.

Another object of the instant invention is to provide a web supply and guiding arrangement which is economical and simply operated.

A further object of this invention is to provide a web supply and guiding arrangement which is compatable with web handling machines previously known.

A still further object of the present invention is to provide a web supply arrangement for a center unwind reel which will allow that reel to unwind at a substantially high rate of speed.

Another further object of the instant invention is to provide a center unwind web supply which will unwind at a substantially high rate of speed without damaging the web thereon and which is unpowered except for the effect of the tension within the web.

Other objects and many of the attendant advantages of the present invention will become readily apparent to those skilled in the art as a better understanding of the present invention is obtained by reference to the following detailed description when considered in connection with the accompanying drawings, wherein.

Figures 1, 2, 3, 4, 5:
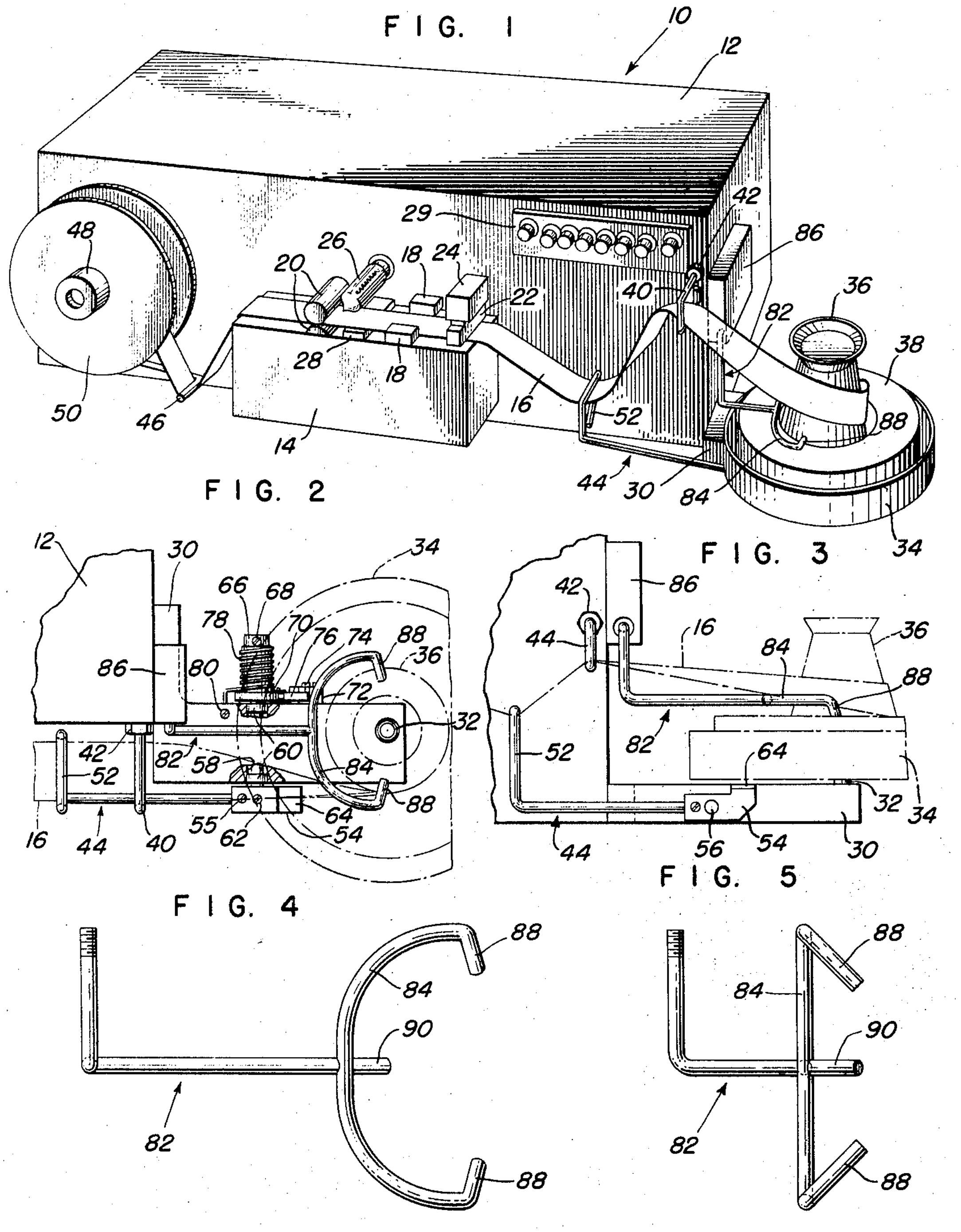
FIG. 1 is a perspective view, showing a web sensing arrangement including a center unwind supply reel incorporating an embodiment of the present invention.
FIG. 2 is a top horizontal view, showing the center unwind web supply of the present invention.
FIG. 3 is a side elevation view, showing the center unwind web supply of FIG. 2.
FIGS. 4 and 5 are a top view and a front elevation view, respectively, of a second embodiment of a web contacting arm used within the present invention.

The center unwind web supply utilizes a singular disk type supply reel having a central hub portion which extends upwardly along the major axis thereof. A toroidally shaped web stack is placed with its opened center portion around the extended centeral hub portion of the supply reel. The supply reel is rotatably mounted upon a mounting plate adjacent to a component housing containing a web sensing machine. A first fixed guide is provided for receiving the web as it is removed from the supply reel, while a second pivotal guide receives the web therefrom before it enters the web sensing machine. The second pivotal guide includes an arm and a brake shoe pivotally attached to the mounting plate and arranged so that an increasing tension within the web raises the arm thereof and removes the brake shoe from a frictional contact against the lower surface of the supply reel. This combination removes the braking force applied to the supply reel for freeing the rotational motion thereof. A bifurcated arm having oppositely arranged inwardly directed fingers is disposed for contacting the inner peripherial surface of the toroidal web stack. The fingers of the arm interact with the web for preventing the web from tightening about the central hub portion of the supply reel. The web, after passing through the web sensing machine, passes over a take-up pivotal tension arm before being wound upon a take-up reel.

Referring now to the drawings, FIG. 1 shows a web sensing machine, such as a paper tape reader 10, housed within a component housing chassis 12, forwardly extending from the front surface thereof. The paper tape reader 10 includes a lower chassis 14 across which a web member, such as a paper tape 16, is edge guided by a pair of guiding blocks 18. Motion is imparted to the paper tape by a set of pinch rollers 20. When it is desired to stop the motion of the paper tape, the pinch rollers are opened and a brake 22 is applied to the tape by the removal of an energizing current from a solenoid 24, associated therewith. A light source 26 is provided opposite a photoelectric cell 28 and the tape 16 is arranged therebetween for establishing the output of the paper tape reader 10. The output therefrom may be utilized by many devices, such as a magnetic tape recorder not shown. It should be understood that the paper tape reader thus described may be one of several arrangements currently known and the present invention is not intended to be limited by the description thereof.

The component housing 12 includes a control panel 29 for mounting and displaying the controls and indicators of the paper tape reader 10. A mounting plate 30 is attached to the right-hand side of the component housing 12, as viewed from the front, by screws not shown. A pivot post 32, FIGS. 2 and 3, provides a rotational support for a supply reel 34. In the preferred embodiment the pivot post 32 is rotationally mounted within a cylindrical opening, not shown, within the mounting plate 30 by a pair of ball bearings, also not shown. The supply reel 34 is constructed from a disk having an upwardly directed peripherial portion which forms an edge flange. The center of the disk is provided with a tapering central hub portion 36 which decreases in diameter as it extends along the major axis of the supply reel away from the disk portion thereof. The paper tape 16, formed into a toroidally shaped stack 38, is placed upon the supply reel 34 with the central hub portion 36 passing through the central opening of the stack. A first fixed guide 40 is attached to the front surface of the component housing 12 for receiving the paper tape 16 therethrough, as it unwinds from the center of the stack 38. The fixed guide 40 is formed from a rod bent into a rectangular loop through which the paper tape passes. One leg of the rectangular guide is extended and threaded for attachment to the housing 12, as by nuts 42. A second pivotal guide 44 is provided for receiving the tape 16 after it passes through the fixed guide 40. The pivotal guide 44 is generally located in a lower position than the fixed guide 40 and the lower chassis 14 of the paper tape reader 10. In this manner, an increase in tape tension causes a corresponding rise in the position of the pivotal guide 44 for removing a frictional brake from the supply reel, as will be described in greater detail hereinbelow. As the tape 16 exists the pivotal guide 44, it passes through the paper tape reader 10 and under a pivotal tension arm 46 before it is wound around a hub portion 48 of a take-up reel 50. After the tape 16 is completely wound upon the take-up reel 50, the forward most flange thereof may be removed for enabling an operator to remove the newly formed tape stack from the hub 48 for reuse or storage. The tension imparted to the tape by a take-up reel drive motor, not shown, is not great enough to prevent the removal of the paper tape therefrom by hand.

The pivotal guide 44 includes a guide arm 52 retained within a brake shoe 54, as by a set screw 55, FIG. 2. The brake shoe 54 pivotally supports the arm 52 upon a shaft 56 which extends through a cylindrical passage 58 within the side of the mounting plate 30. Bearings 60 are mounted within the passage 58, as by a press fit, for imparting pivotally free motion to the shaft 56. The brake shoe is attached to the shaft 56, as by a set screw 62, and provided with a surface which parallels the lower surface of the supply reel 34 when the guide arm 52 is in its lowermost position. A pad 64 of frictional material, such as felt, is attached to this surface, as by bonding. This provides a smooth braking effect as the arm 52 pivots toward its lowermost position, due to an absence of tension within the tape 16. The guide arm 52 extends in a plane parallel to the tape motion, away from the brake shoe 54, and then is displaced upwardly toward the tape where it terminates in a rectangularly shaped loop for receiving the tape in guiding arrangement.

A collar 66 mounts on an extended portion of the shaft 56, as by set screws 68. The shaft 56 extends behind the mounting plate 30 having a cam 70 arranged between the collar 66 and the backmost bearing 60. The cam 70 is arranged to prevent longitudinal motion of the shaft 56 along the axis thereof and to actuate a switch 72. The switch 72 attaches to the mounting plate 30, as by screws 74, and is provided with a follower 76 for sliding contact with the cam 70. A torsional spring 78 encompasses the collar 66 and is attached thereto at one end while the second end thereof is secured within the mounting plate 30, as by a set screw 80. The spring 78 urges the pivotal guide 44 toward its lowermost position. The urging force within the spring may be adjusted by loosening the set screw 68, winding or unwinding the torsional spring 78 to the desired tension, and retightening the screw. The cam 70 may be adjusted in a similar manner for closing the switch 72 at a predetermined position of the pivotal guide 44 thereby providing an indication of tight tape, as by energizing an indicator on panel 29.

The arrangement of the pivotal tension arm 46 is substantially as described with respect to the pivotal guide 44. The tension arm 46 is spring urged, as is the pivotal guide 44, in a downward direction against the tension within the tape 16. As the tension increases, the arm 46 rises to actuate a switch, not shown. Actuation of the switch shuts off the take-up motor, also not shown, for slowing the rotational speed of the take-up reel and allowing the paper tape reader to dispense tape at a rate faster than the winding action of the take-up reel. Thus, the tension within the tape decreases for lowering the pivotal tension arm and actuating the take-up motor through the switch arrangement, as described hereinabove.

A bifurcated web contacting arm 82 is provided including an arcuate portion 84 semi-encompassing the supply reel central hub portion 36. The web contacting arm extends away from the central hub portion 36, bends upwardly at a right angle, and is then displaced at a second right for passage through a mounting block 86, in a pivotal arrangement. The end portion of the contacting arm 82 passing through the mounting block 86 is threaded, as shown in FIGS. 4 and 5. A spring is placed about the threaded end portion of the arm 82 and retained there by a suitable nut, not shown. Through this arrangement the web contacting arm 82 may be raised out of contact with said web stack 38 and lowered into contact therewith. In its lowered position, the plane formed by the web contacting arm 82 and the arcuate portion thereof 84 is parallel with the plane of the supply reel 34 and web stack 38. Each end of the arcuate portion 84 is provided with a web contacting finger 88 which extends downwardly toward the supply reel 34, and inwardly, toward the central hub portion 36 thereof. For example, in the preferred embodiment the fingers 88 are displaced inwardly at a right angle directed toward the center of the arcuate portion. The fingers are then downwardly directed at an angle of 45° to the plane of the contacting arm and arcuate portion or the major axis of the supply reel. They are finally displaced forwardly 15° away from the center of the arcuate portion or the major axis. That is, the fingers are displaced in a forward direction away from a plane parallel to the major axis of the supply reel and passing through the two points formed by the junction of the arcuate portion 84 and the fingers 88. This arrangement is relatively important. First, the angular relationship of the fingers prevents the tape from tightening about the hub; and, second, the angular relationship prevents the tearing of paper tape, as it is impossible for the fingers to catch in an information hole within the tape.

A second embodiment of the web contacting arm is illustrated in FIGS. 4 and 5 wherein, a third web contacting finger 90 has been added to the center of the arcuate portion 84 opposite the straight arm portion thereof. The trifurcated web contacting arm thus formed provides an added finger for preventing the tightening of tape during high speed tape dispensing. The third finger 90 is displaced downwardly toward the supply reel. In the preferred embodiment the angle of displacement is 45° to the plane of the supply reel 34.

In operation, a stack of paper tape 38 is placed upon the supply reel 34 and threaded through the guides 40 and 44 into the paper tape reader 10 and, finally, to the take-up reel 50, as disclosed hereinabove. The web contacting arm 82 is lowered into its operating position, parallel to the plane of the supply reel, with web contacting fingers resting between the inner periphery of the toroidal tape stack 38 and the central hub portion 36. The leading portion of the paper tape 16 separates from the inner periphery of the stack 38, as it passes under the backmost web contacting finger 88. The tape then spirals upwardly around the tapering central hub portion 36 and departs therefrom toward the first fixed guide 40. The web contacting fingers 88 prevent more than one loop of tape from peeling off the inner periphery of the tape stack during a given revolution, thereby prevent the tightening of the tape about the hub portion. The speed at which the supply reel dispenses the tape is entirely dependent upon the tape tension. As the tension drops within the tape, the pivotal guide 44 pivots to a lower position for applying a frictional braking effect to the supply reel 34. The resultant increased tension within the tape lifts the pivotal guide 44 and releases the brake for allowing the acceleration of the supply reel.

Thus, the web contacting arm 82 and the pivotal guide 44 combine to prevent damage to the paper tape 16 during high speed dispensing thereof. The pivotal guide 44 controls the tape tension through acceleration and deceleration of the supply reel rotation, and the web contacting arm prevents the tape from loosening and becoming entangled and damaged due to the accentuated effect of the supply reel motion during high speed tape dispensing.

In keeping with the objects of the present invention, there has been provided a center unwind web supply reel which is unpowered and provides rapid dispensing of paper tape at a substantially high rate of speed without damage thereto. Although the present invention has been embodied within a device capable of bench mounting, it should be understood by those skilled in the art that minor changes will enable the use of the center unwind web supply in a panel mounting arrangement. Further, the center unwind web supply is not intended to be limited to the dispensing of paper tape, but may be utilized for many applications of web handling.

Obviously, many modifications and variations of the present invention are possible in the light of the above teachings. It is therefore to be understood that within the scope of the appended claims the invention may be practiced otherwise than as specifically described.

What is claimed is:

1. A center unwind web supply for high speed web dispensing comprising, unpowered low inertia reel means having a flange means and a centrally arranged hub means, mounting means for supporting said unpowered reel means in a freely rotatable arrangement, first and second web guide means, means pivotally mounting said second guide means for providing a controlled tension within said web as it is dispensed from said reel means under the urging of said tension, and web contacting arm means arranged to prevent the tightening of said web about said hub means as it is dispensed therefrom for allowing the high speed unwinding of said web from the center of said reel means.

2. A center unwind web supply for high speed web dispensing comprising reel means having a flange means and a centrally arranged hub means, mounting means for supporting said reel means in a freely rotatable arrangement, first and second web guide means, means pivotally mounting said second guide means for providing a tension within said web as it is dispensed from said reel means, web contacting arm means arranged to prevent the tightening of said web about said hub means having a bifurcated portion semi-encompassing said hub means, mounting block means pivotally mounting said bifurcated web contacting arm means for engagement with said web means in a first pivotal position and disengagement therewith in a second pivotal position, and web contacting fingers extending from the ends of said bifurcated position downwardly and inwardly between said web and said hub means when said bifurcated web contacting arm means is in said first pivotal position thereby allowing the high speed unwinding of said web from the center of said reel means.

3. A center unwind web supply as claimed in claim 2 wherein said bifurcated portion of said web contacting arm means is arcuately formed having said downwardly and inwardly directed web contacting fingers at each end and a third finger downwardly extending from the center of said arcuately formed portion thereof for forming a trifurcated portion of said web contacting arm means.

4. A center unwind web supply as claimed in claim 2 wherein said downwardly and inwardly extending web contacting fingers are forwardly directed with relation to the major axis of said hub means.

5. A center unwind web supply as claimed in claim 2 additionally comprising, shaft means pivotally mounted within said mounting means, said second web guiding means further including arm means and brake shoe means, said brake shoe means being attached to said pivotally mounted shaft means and arranged for frictionally contacting said reel means as said web tension decreases.

6. A center unwind web supply for dispensing a web from a web stack at substantially high rates of speed comprising, supply reel means including a flange means and a hub means disposed along the major axis thereof for supporting said web stack about said hub means, mounting plate means, post means secured on said mounting plate for rotatably receiving said supply reel means, mounting block means, web contacting arm means having a bifurcated arcuate portion semi-encompassing said hub means, said arm means disposed within said mounting block for pivotal positions, web contacting fingers extending from each end of said arcuate portion of said arm means extending downwardly and inwardly between said web stack and said hub means when said arm means is in a web contacting pivotal position, first fixed web guiding means for receiving said web as it is dispensed from said supply reel means, second pivotal web guiding means receiving said web from said first web guide means, and means associated with said second pivotal web guiding means for regulating said supply reel means as a function of a tension within said web for achieving a substantially high rate of speed as said web is unwound from the center of said supply reel means.

7. A center unwind web supply as claimed in claim 6 wherein said web contacting fingers of said arcuate portion extend inwardly toward said major axis of said hub means and downwardly at an angle of 45° therefrom and extend forwardly at an angle of 15° to a plane formed parallel to said major axis and passing commonly through the points of extension between said arcuate portion and said web contacting fingers.

(References on following page)

References Cited

UNITED STATES PATENTS

| | | | |
|---|---|---|---|
| 1,401,123 | 12/1921 | Anderson | 242—156.2 X |
| 1,908,073 | 5/1933 | Spoor et al. | 242—156.2 X |
| 2,443,248 | 6/1948 | Hurley | 242—55.18 |
| 2,449,302 | 9/1948 | Ketterer | 242—156.2 |
| 3,276,709 | 10/1966 | Harris | 242—55.19 |

WILLIAM S. BURDEN, *Primary Examiner.*

U.S. Cl. X.R.

242—55.18